US007822531B2

(12) United States Patent
Alger, II et al.

(10) Patent No.: US 7,822,531 B2
(45) Date of Patent: Oct. 26, 2010

(54) STRATIFIED CHARGE GASOLINE DIRECT INJECTION SYSTEMS USING EXHAUST GAS RECIRCULATION

(75) Inventors: Terrence Francis Alger, II, San Antonio, TX (US); Charles Edward Roberts, Jr., Helotes, TX (US); Darius Mehta, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 247 days.

(21) Appl. No.: 12/111,010

(22) Filed: Apr. 28, 2008

(65) Prior Publication Data

US 2009/0266344 A1   Oct. 29, 2009

(51) Int. Cl.
G06F 19/00 (2006.01)
F02B 3/02 (2006.01)
F02B 47/08 (2006.01)
F02M 25/07 (2006.01)
F02M 51/00 (2006.01)

(52) U.S. Cl. .................. 701/104; 701/108; 123/299; 123/305; 123/568.21

(58) Field of Classification Search ............ 123/295, 123/299, 300, 304, 305, 431, 568.11, 568.21; 701/101–105, 108, 110, 115
See application file for complete search history.

(56) References Cited

U.S. PATENT DOCUMENTS

| 5,979,397 | A | 11/1999 | Machida et al. | |
|---|---|---|---|---|
| 6,343,585 | B1 * | 2/2002 | Fujieda et al. | 123/295 |
| 6,453,871 | B1 * | 9/2002 | Fujieda et al. | 123/295 |
| 6,640,773 | B2 * | 11/2003 | Ancimer et al. | 123/299 |
| 6,668,789 | B1 | 12/2003 | Marriott et al. | |
| 6,698,189 | B1 | 3/2004 | Posselt | |
| 6,874,315 | B2 * | 4/2005 | Nakatani et al. | 60/285 |
| 6,912,992 | B2 * | 7/2005 | Ancimer et al. | 123/299 |
| 7,021,277 | B2 | 4/2006 | Kuo et al. | |
| 7,152,559 | B2 | 12/2006 | Kuo | |
| 7,228,839 | B2 | 6/2007 | Kuo et al. | |
| 7,684,925 | B2 * | 3/2010 | Kuo et al. | 701/113 |
| 2003/0177761 | A1 | 9/2003 | Wagner | |
| 2003/0178009 | A1 | 9/2003 | Pellizzari | |

(Continued)

OTHER PUBLICATIONS

Alger, et al., "Synergies between High EGR Operation and GDI Systems," SEA International 2008-01-0134 available at http://www.sae.org/technical/papers/2008-01-0134.

(Continued)

Primary Examiner—Willis R Wolfe, Jr.
(74) Attorney, Agent, or Firm—Grossman, Tucker, et al.

(57) ABSTRACT

An aspect of the present disclosure relates to a method and system for reducing emissions and improving knock-tolerance in an engine. Air, including exhaust gas present at levels greater than 20% by total air mass, may be introduced into a combustion chamber having a volume including a piston and a cylinder head. A first amount of fuel and a second amount of fuel may be directly injected into the combustion chamber at various points during the cycle, wherein the ratio of the air, including the exhaust gas, to the first and second amounts of fuel is 14.0:1 to 15.0:1. The first and second amounts of fuel may then be ignited. An electronic control unit may be utilized to time the injections and control the introduction of exhaust gas.

12 Claims, 5 Drawing Sheets

U.S. PATENT DOCUMENTS

| | | |
|---|---|---|
| 2003/0178011 A1 | 9/2003 | Pellizzari |
| 2004/0011029 A1 | 1/2004 | Wagner |
| 2004/0055561 A1 | 3/2004 | Wagner |
| 2004/0226546 A1 | 11/2004 | Pellizzari et al. |
| 2005/0081833 A1 | 4/2005 | Pellizzari et al. |
| 2005/0258266 A1 | 11/2005 | Elia et al. |
| 2006/0005818 A1 | 1/2006 | Kuo et al. |
| 2006/0016417 A1 | 1/2006 | Kuo et al. |
| 2006/0016420 A1 | 1/2006 | Kuo et al. |
| 2006/0016422 A1 | 1/2006 | Kuo et al. |
| 2006/0101811 A1 | 5/2006 | Linna et al. |
| 2006/0196469 A1 | 9/2006 | Kuo et al. |
| 2006/0243241 A1 | 11/2006 | Kuo et al. |
| 2007/0056570 A1 | 3/2007 | Elia et al. |
| 2007/0089705 A1 | 4/2007 | Reuss et al. |
| 2009/0038583 A1* | 2/2009 | Gwidt et al. ............ 123/299 |

OTHER PUBLICATIONS

Kolbenschmidt Pierburg Group, "Exhaust Gas Recirculation, Reducing Emissions with Exhaust Gas Recirculation Systems," available at http://www.kspg-ag.de/pdfdoc/kspg_produktbroschueren/2007/pb01_egr.pdf.

SEA International, "Automotive Engineering International Online, Tech Briefs, Jul. 2002," available at www.sea.org/automag/techbriefs/07-2002, retrieved on Sep. 24, 2007.

* cited by examiner

STRATIFIED CHARGE GASOLINE DIRECT INJECTION SYSTEMS USING EXHAUST GAS RECIRCULATION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

FIELD OF THE INVENTION

The present disclosure relates generally to the use of gasoline direct injection systems and, in particular, the use of a stratified charge to improve stability at relatively high exhaust gas recirculation levels.

BACKGROUND

In gasoline direct injection (GDI) systems fuel may be injected at relatively higher pressures over a common rail system directly into the combustion chamber of an engine. Gasoline direct injection allows for stratified charge, wherein the air/fuel mixture may be layered. A rich portion of the air to fuel mixture may be directed around the spark plug and fresh air or a mix having a relatively lower air to fuel ratio may be present around the richer portion. In addition, GDI systems may be run at relatively lean conditions, where air to fuel ratios may be 50:1 or higher. However, running GDI systems at lean conditions may require relatively costly after treatment systems or may fail in attaining various emissions standards.

Exhaust gas recirculation may provide benefits in terms of reducing certain emissions and improved fuel consumption at moderate loads, including those greater than 5 bar and up to 8 bar. Such benefits may include improvements in fuel consumption, carbon monoxide emissions and nitrous oxide emissions. For example, improvements in fuel consumption for a given engine may be in the range of 1% to 3%, nitrous oxide emissions may be reduced by 10% to 80% and carbon monoxide emissions may be reduced by 5% to 20% upon the introduction of 5% to 20% EGR at 1500 rpm and 8 bar. In addition, the coefficient of variation of the indicated mean effective pressure (cov imep) may be less than 1.5%. At these conditions, some increase in hydrocarbons may be exhibited, in the range of under 5% to 45%.

However, this may not be true across all engine speeds and loads, such as low loads of 5 bar and less, as increased EGR amounts may lead to engine instability as reflected by an increase in cov imep. For example, the cov imep at an engine speed of 2,000 rpm and pressures of 2 bar and 5 bar may be greater than 1% and up to 6%. While some improvements in fuel consumption may be seen up to 3% some decreases may also be exhibited at loads of 5 bar.

SUMMARY OF THE INVENTION

An aspect of the present disclosure relates to a method of reducing emissions and improving knock-tolerance in an engine. The method may include providing air, including exhaust gas present at levels greater than 20% by total air mass, and introducing the air, including the exhaust gas, into a combustion chamber having a volume including a piston and a cylinder head. A first amount of fuel may be directly injected into the combustion chamber, when the piston is moving away from the cylinder head, and a second amount of fuel may be directly injected into the combustion chamber, when the piston is moving towards the cylinder head. The first and second amounts of fuel may then be ignited wherein the ratio of the air to the first and second amounts of fuel is 14.0:1 to 15.0:1.

Another aspect of the present disclosure relates to a system for reducing emissions and controlling knock. The system may include a combustion chamber having a volume including a piston and a cylinder head, a fuel injector, configured to directly inject fuel into the combustion chamber and an electronic control system in electrical communication with the fuel injector. The system may also include a high pressure exhaust gas recirculation valve in electrical communication with the electronic control system and a low pressure exhaust gas recirculation valve in electrical communication with the electronic control system. The electronic control system may be configured to introduce air, including exhaust gas present at levels greater than 20% by total air mass, into the combustion chamber, inject a first amount of fuel directly into the combustion chamber, when said piston is moving away from the cylinder head, inject a second amount of fuel directly into the combustion chamber, when the piston is moving towards the cylinder head, and ignite the first and second amounts of fuel, wherein the ratio of the air to the first and second amounts of fuel is 14.0:1 to 15.0:1.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
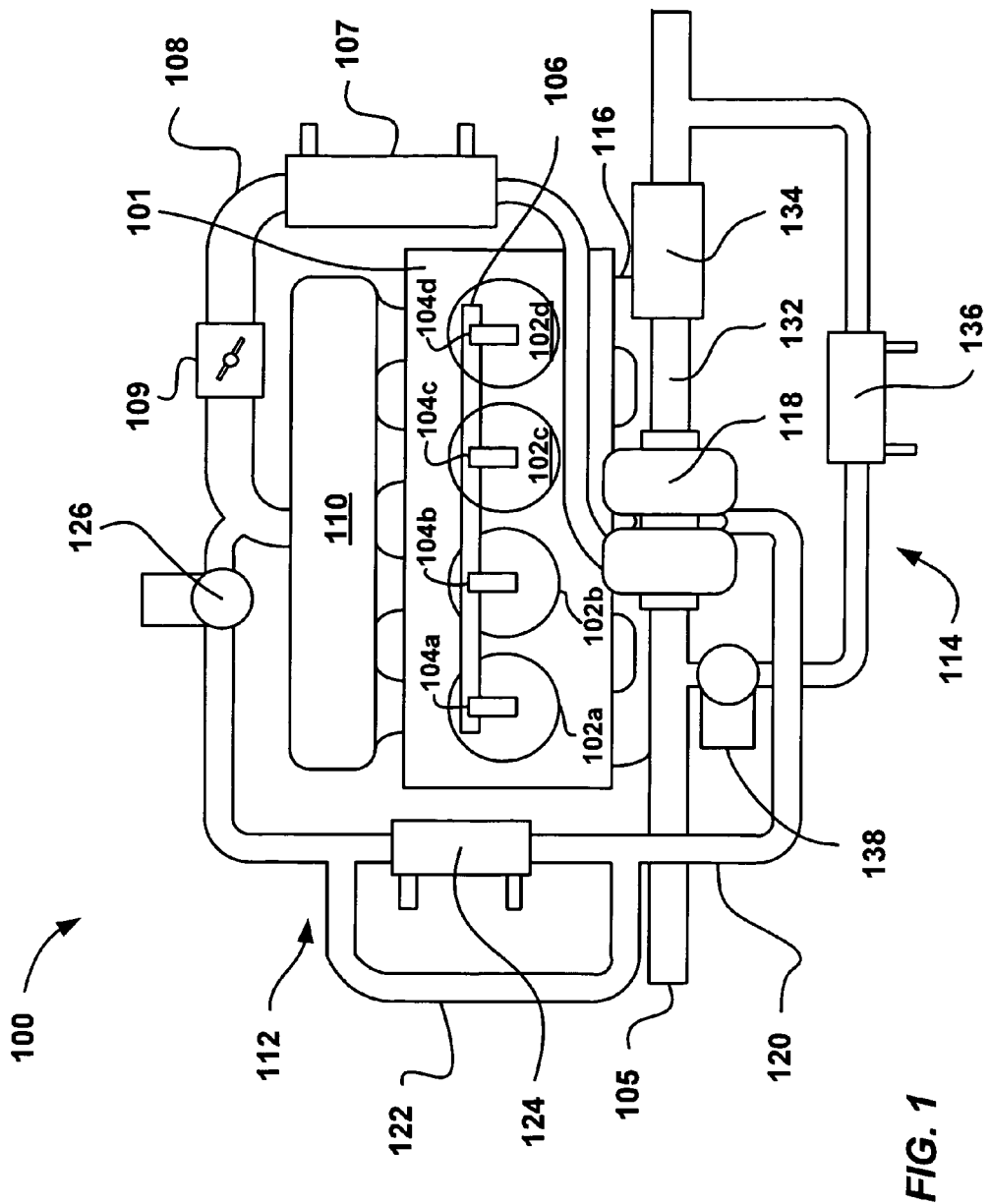
FIG. 1 is schematic diagram of an example of a gasoline direct injection engine.

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

FIG. 1 illustrates an example of a gasoline direction injection system 100 including a dual loop exhaust gas recirculation system (EGR). The gasoline direct injection engine, as illustrated, may be a four stroke engine. However, it may be appreciated that gasoline direct injection engines may be two strokes or higher, including two strokes to twelve strokes, including all values and increments therein. The system may include an internal combustion engine 101, e.g., a spark ignition engine, with a dual-loop EGR system. The engine 101 may include four cylinders 102a, 102b, 102c, 102d, however it may be appreciated that one or more cylinders in a given engine application.

In one embodiment, each cylinder 102a, 102b, 102c and 102d, may further have an associated fuel injector 104a, 104b, 104c, and 104d, respectively. Each fuel injector 104a, 104b, 104c, and 104d may be operatively connected to a common rail 106. The common rail 106 may be connected to a fuel supply (not shown) and may supply fuel relatively continuously to each injector 104a, 104b, 104c, 104d. Each injector 104a, 104b, 104c, 104d may then individually regulate the fuel provided to each cylinder 102a, 102b, 102c and 102d.

The engine 101 may receive air via intake manifold 110. The intake manifold 110 may be connected to each cylinder 102a, 102b, 102c and 102d through an associated valve or valves (not shown). The intake manifold 110 may be further connected to a dual loop EGR system, including a high pressure loop 112 and a low pressure loop 114. Exhaust manifold 116 may receive exhaust gas from the engine 101 and may provide this exhaust gas to a turbocharger or supercharger 118 and/or the high pressure EGR system 112.

A turbocharger may be understood to mean a turbine and a compressor that may be coupled by a shaft. The flow of the exhaust gas may cause the turbine to rotate which may then activate the compressor. Incoming air and/or EGR gas to the compressor may then be compressed and forced out of the compressor into, e.g., an intake manifold, and thereby into one or more cylinders. It may be appreciated that a variable geometry turbocharger may allow one or more parameters of the turbocharger, e.g., turbine vane angle, to be varied. This variable geometry may then allow relatively more uniform compressor output over a range of engine speeds. This relatively more uniform output may be accomplished by maintaining a relatively uniform turbine, shaft and compressor rotational speed. A super charger may also compress the intake air but may be driven by the crank shaft.

The high pressure EGR system 112 may include the exhaust manifold 116 that may be coupled to a high pressure EGR channel (HP-EGR) 120. A bypass valve (not illustrated) may couple the HP-EGR channel 120 to an alternate channel 122 at a first location. An alternate channel may bypass the HP-EGR cooler 124 and may be further coupled to HP-EGR channel 120 at a second location. A HP-EGR valve 126 may regulate the flow of exhaust gas delivered to the intake manifold 110 from HP-EGR channel 120.

The low pressure EGR system 114 may include the exhaust manifold 116, which may be coupled to a low pressure EGR channel (LP-EGR) 130. The exhaust manifold 116 may be coupled to turbine channel (not illustrated), which may be coupled to turbine 118. The turbine 118 may be coupled to exhaust catalyst channel 132. The exhaust catalyst channel 132 may include a three-way catalytic converter system 134. A three-way catalytic converter may be understood as a system which may reduce nitrous oxides ($NO_x$) into $N_2$ and $xO_2$; oxidize carbon monoxide (CO) into ($CO_2$); and oxidize unburned hydrocarbons (HC) into carbon dioxide ($CO_2$) and water ($H_2O$).

A portion of the exhaust may be diverted into the LP-EGR channel 130 and a portion may leave the system 100 through the exhaust channel 132. The LP-EGR channel 130 may include a LP-EGR cooler 136, which may reduce the temperature of the LP-EGR gas. In addition, the LP-EGR channel 130 may include a LP-EGR valve 138 regulating the amount of low pressure exhaust passing back into the intake channel 108. It may be appreciated that while, as illustrated, the HP-EGR channel 120 connects with the intake channel 108 prior to the intake valve 109 and the low pressure (LP-EGR) channel 130 may connect with the intake channel 108 prior to air entering the turbocharger 118, various other arrangements may be provided as well.

In one embodiment, the air and/or EGR gases provided to the intake manifold 110 by the HP-EGR system 112 and LP-EGR system 114 may be quite different. For example, the HP-EGR loop receives EGR gas directly from the exhaust manifold 116. Accordingly, this EGR gas may contain relatively hot unburned air and/or relatively hot unfiltered EGR gas that may include $NO_x$, CO and/or HC. This air and/or EGR gas may or may not pass through an HP EGR cooler 124 prior to being provided to the intake manifold 110.

On the other hand, the LP-EGR loop may receive EGR gas that has passed through the turbine 118 (and done work), and that has been filtered by three-way catalytic converter 134. The filtered EGR gas may then pass through EGR cooler 136 and may mix with ambient air in compressor input channel 105. The mix of ambient air and filtered EGR gas may then be compressed in the compressor 118. The compressed air and/or filtered EGR gas may then pass through intercooler 107. The compressed and cooled air and/or filtered EGR gas may be regulated by intake throttle 109 and may then be provided to the intake manifold 110. Accordingly, this air and/or filtered EGR gas may contain a relatively larger fraction of ambient air and a relatively smaller fraction of exhaust gas than the EGR gas provided by the HP-EGR system.

Figure 2:
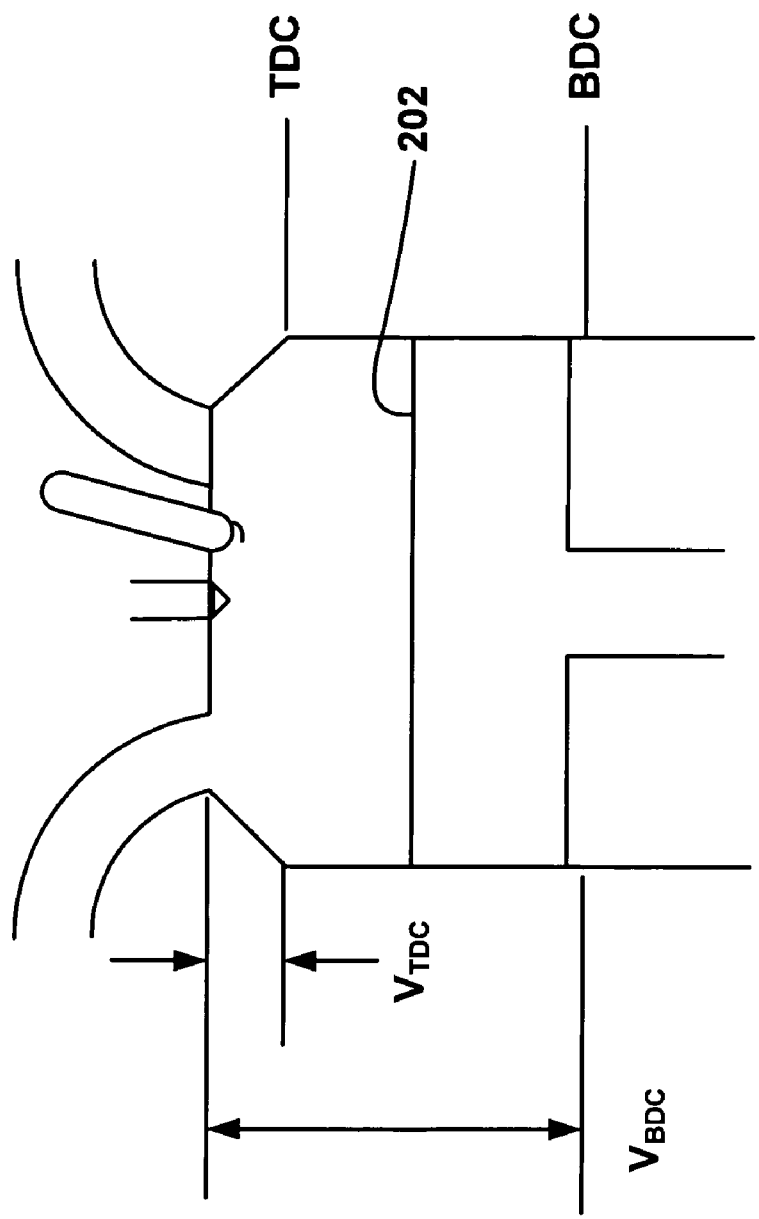
FIG. 2 is an illustration of a combustion chamber.

The engine displacement may be 1 liter or greater, including all values and increments in the range of 1 L to 10 L. Engine displacement may be understood as the total volume of air or air/fuel mixture an engine can draw in during one cycle by all of the cylinders, or may be understood as the volume swept by the pistons as the head of the piston 202 is moved from top dead center TDC, i.e., to the top of the cylinder, to bottom dead center BDC, i.e., to the bottom of the cylinder, as illustrated in FIG. 2. Furthermore, the engine may have a compression ratio of 7:1 to 13:1, where the compression ratio may be understood as the change volume of the combustion chamber when the piston is at the top dead center $V_{TDC}$ and the bottom dead center $V_{BDC}$.

Figure 3:
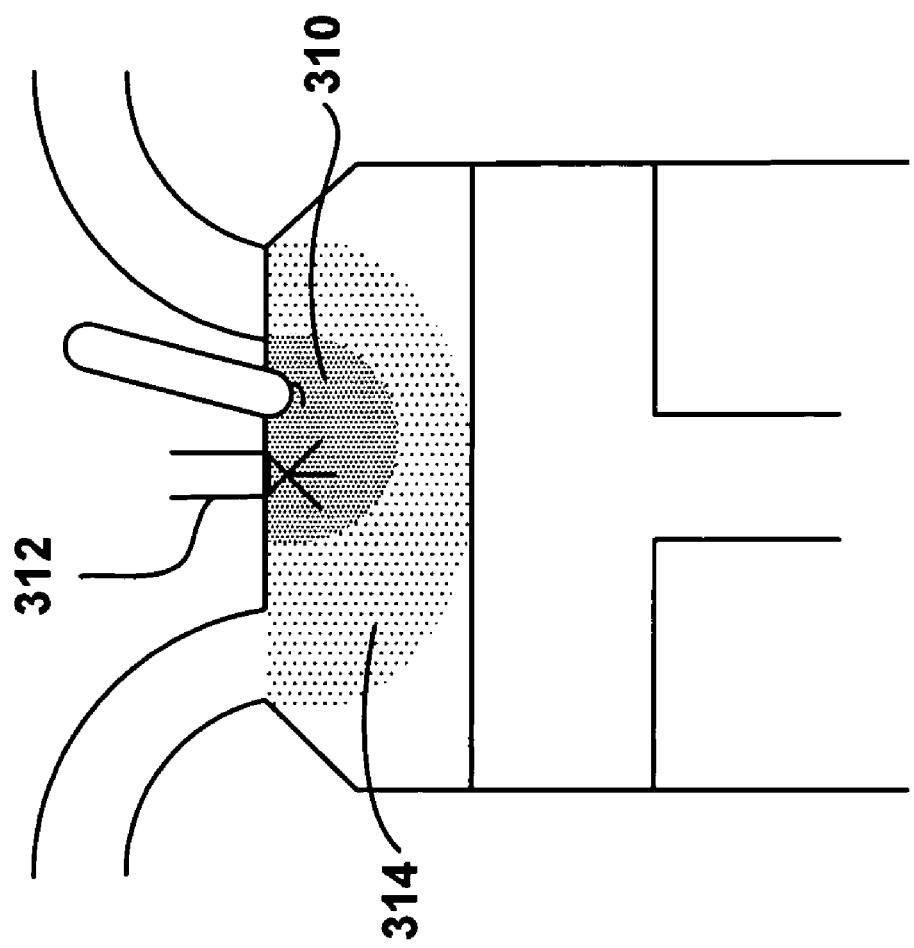
FIG. 3 is an example where a rich mixture of air and fuel positioned proximate to a spark plug.

In addition to the above, gasoline direct injection systems may also provide for a stratified charge, wherein the air/fuel mixture may be layered. As illustrated in FIG. 3, a rich charge 310 may be directed around the spark plug 312 and fresh air or a mix having a relatively lower air to fuel ratio 314 may be present around the rich charge 310. The flame front may propagate through the rich charge and into the remaining area. A stratified charge may be developed by varying the physical geometry of the piston bowl and/or cylinder head and placement of the injection nozzle or intake valve. For example, the system may include a wall directed combustion system, where fuel may be injected into the combustion chamber from the side and deflected by a recess in the piston bowl towards the spark plug. In another example, the system may include an air-directed combustion system wherein a charge cloud moves on a cushion of air. In a further example, the system may include a jet-directed combustion process wherein the injector is installed at the very top of the cylinder, injecting into the combustion chamber and the fuel may be ignited directly after injection.

In addition to these mechanisms, a dual injection strategy may also be used herein to develop a stratified charge. A dual injection strategy may be understood as an injection strategy wherein the fuel charge may be injected in at least two stages. FIGS. 4a through 4d illustrate the motion of a piston 402 within the cylinder 404 during an example of a four-stroke cycle incorporating a dual injection strategy. The piston 402, cylinder 404, and cylinder head 408 may form the combustion chamber, which may be understood as the location where combustion occurs in the engine. Therefore, it may be appreciated that the combustion chamber volume may vary throughout the cycle as the piston extends and retracts in the cylinder.

Figure 4:
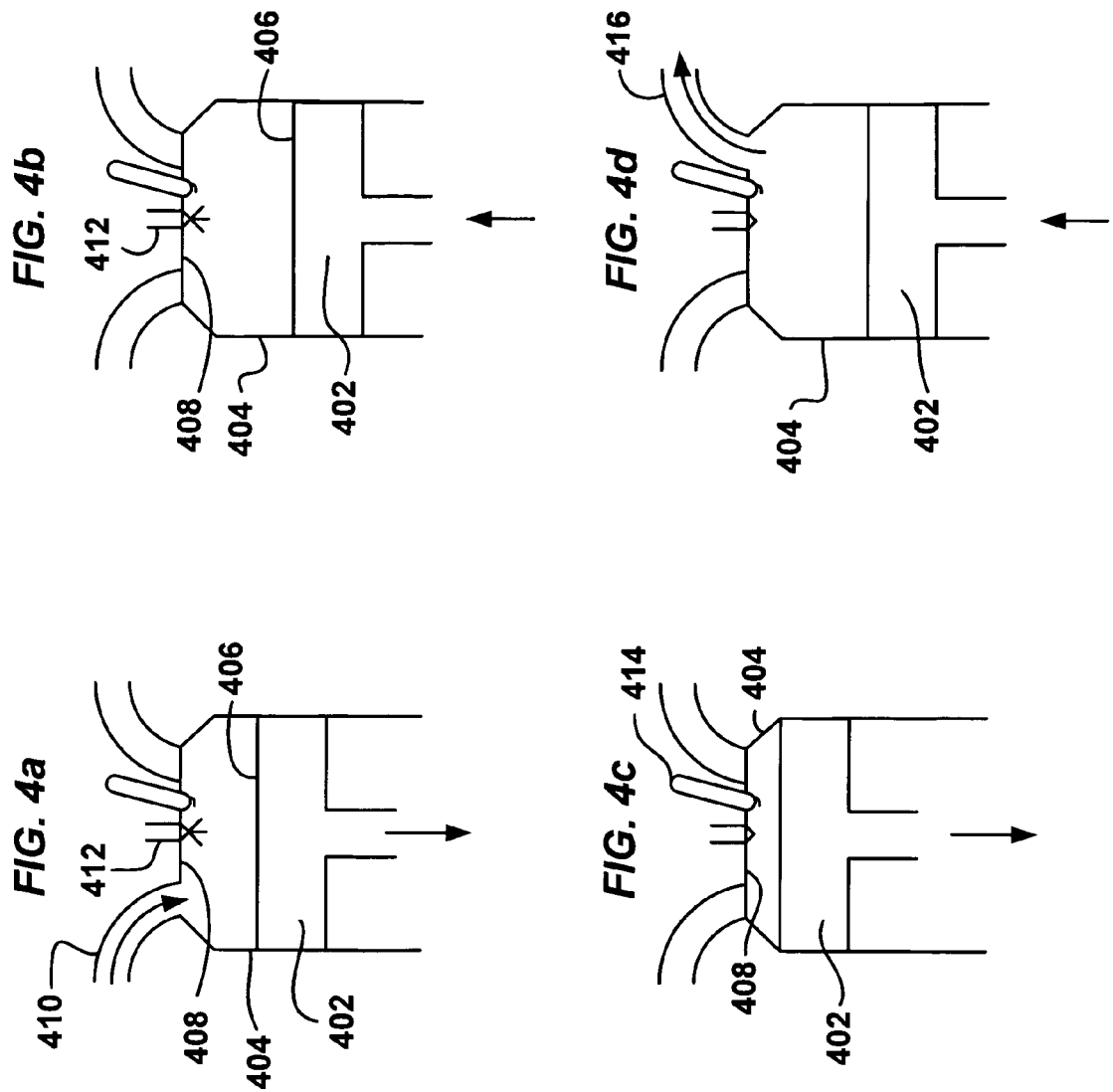
FIGS. 4a-4d illustrate an example of piston motion and dual injection during a four stroke cycle.

In FIG. 4a, air may be introduced into one of the engine cylinders 404, through a runner 410 connecting the cylinder 404 to air intake manifold (110 of FIG. 1) as the piston 402 retracts within the cylinder and moves away from the cylinder head 408. Motion of the piston in the cylinder may be quantified in terms of crank angle, i.e., the angle of the crank shaft. The piston may be connected to the crankshaft, either directly or indirectly, such that as the piston moves up and down in the cylinder, the crankshaft turns. As referenced to herein, when the piston is fully extended in the cylinder at the top dead center point, the crank angle may be understood to be at 0°.

A first portion of fuel, in the range of 60% to 95% of the total fuel mass injected for a given stoichiometric charge (see below), including all values and increments therein, such as 80% to 90%, may be injected during the first stage by an injector 412. As noted above, the injector may be a high pressure injector 412, wherein the fuel may be at a pressure of 5 MPa or greater, including all values and increments in the range of 5 MPa to 15 MPa. The first portion of fuel may mix with the incoming charge of air as the piston retracts and begins to extend again in the cylinder.

It may be appreciated that the air may include not only ambient air drawn in through the compressor input channel (105 of FIG. 1), but also exhaust gas air directed through the high pressure exhaust gas system (112 of FIG. 1) and/or the low pressure exhaust gas system (114 of FIG. 1). Exhaust gas air may be present at levels greater than 20% by mass of the intake air. The exhaust gas may be low pressure exhaust gas, high pressure exhaust gas, or a mixture thereof, depending upon the load and temperature of the engine. For example, at low loads, e.g., less than 5 bar, or during cold start, e.g., when the coolant temperature is below 120° F., the exhaust gas may include mostly high pressure exhaust gas provided at a relatively high temperature. The high pressure exhaust gas may be present at greater than 50% by exhaust gas air mass, including all values and increments therein. At higher loads, e.g., 5 bar or greater, or higher temperatures, e.g., when the coolant temperature is above 120° F., the exhaust gas may include mostly low pressure exhaust gas. The low pressure exhaust bas may be present at greater than 50% by exhaust gas air mass.

FIG. 4b illustrates a second stage where compression of the air/fuel mixture takes place in the cylinder, by the extension of the piston 402 towards the cylinder head 408. Mixing of fuel from the first injection event with air/exhaust gas may still occur. In addition, a second injection event may occur during this compression stroke and may form a locally rich region of fuel around the spark plug 414. The second injection event may inject a second portion of fuel in the range of 5% to 40% of the total fuel mass injected for a given stoichiometric charge, including all values and increments therein, such as 10% to 20%.

The air to fuel ratio for the total fuel mass injected may be maintained at or near stoichiometric. The air to fuel ratio may be understood as the ratio of the air mass in the cylinder to the fuel mass in the cylinder. One example of a stoichiometric air to fuel ratio may be understood as the air to fuel ratio exhibiting ideal theoretical combustion, which may generally be understood to be around 14.6:1. It may also be appreciated however, that a stoichiometric air to fuel ratio, in the context of the present disclosure, may depend on factors such as fuel composition, intake air/exhaust composition, temperature, pressure, etc., and may range from 14.0:1 to 15.0:1.

The start of injection for the second injection event may be in the range of about 70 to 110 degrees, including all values and increments therein, before top dead center. In addition, further injection events may be added to the cycle. For example, a third injection event of a fourth injection event may occur to further stratify the charge in the cylinder. Such additional injection events may occur during the injection stage, compression stage or combustion stage of the cycle.

FIG. 4c illustrates a third stage where the spark plug may then ignite causing the fuel in the locally rich region to ignite and burn. Ignition of the fuel may occur between 50° to 0° before top dead center, including all values and increments therein. The flame may propagate from the rich region through the remainder of the fuel. Pressure developed during combustion may cause the piston 402 to move away from the cylinder head 408. During the fourth stage, illustrated in FIG. 4d, the exhaust gases may then be forced out of the cylinder 404 through an exhaust runner 416 by the upward stroke of the piston 402. The exhaust runner 416 may connect the cylinder 404 to the exhaust manifold (116 illustrate in FIG. 1).

Figure 5:
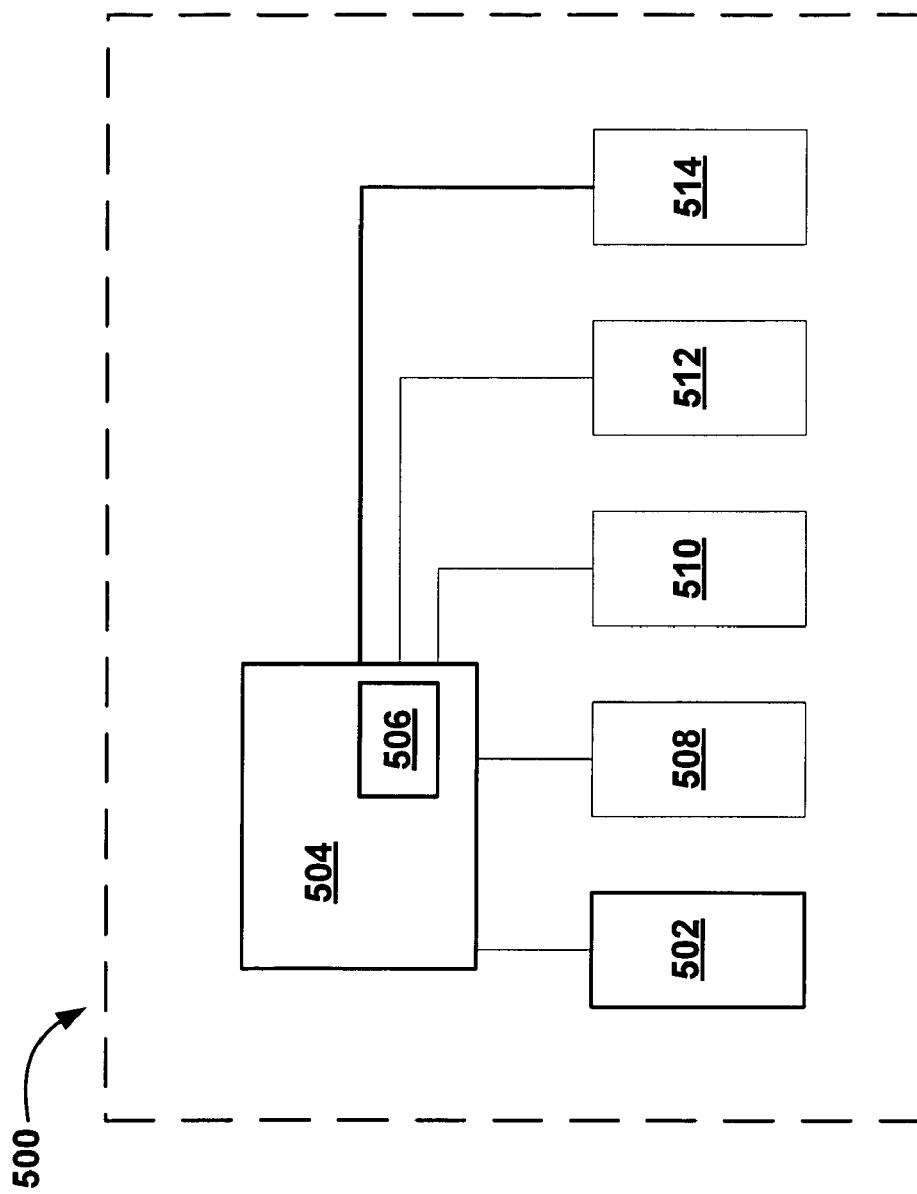
FIG. 5 illustrates an example of an electronic control unit and a knock sensor.

The above injection strategy and injection strategy may be controlled by an electronic control system as illustrated in FIG. 5. The electronic control system 500 may aid in timing of the injection of the fuel and the timing of ignition. The electronic control system 500 may include a processor 504, which may be capable of evaluating various signals received by one or more sensors 502 by a signal evaluation circuit 506. The processor 504 may be configured to electronically communicate with the injection valves 508, intake valve 510, high pressure exhaust gas recirculation valve 512 and/or low pressure exhaust recirculation valve 514 to execute the dual stage injection strategy discussed herein. In one embodiment, the sensor may be a knock sensor. The signals received by the knock sensor may be processed by the signal evaluation circuit. The processor may then control, for example, ignition valve timing, and retard ignition when knock is detected.

The strategies utilized herein may therefore allow for an increase in EGR levels, including at lower loads, to levels of greater than 20% by total air mass for a given stoichiometric charge, including all values and increments in the range of 20% to 30% by total air mass. Total air mass may be understood as the mass of the air and exhaust gas provided into the combustion chambers during a cycle. As alluded to above, adjustments in low vs. high pressure EGR may be made depending on the load or engine temperature. Thus, it may be appreciated that EGR levels may be consistently maintained, regardless of the load, temperature or speed of the engine.

In utilizing the dual injection strategy in combination with EGR levels of greater than 20% by total air mass, for a given stoichiometric charge, the peak torque may improve and/or the engine size may be reduced while obtaining the same power output. For example, the peak torque of the engine may be improved by 5% or greater, including all values and increments in the range of 5% to 50% as compared to a like engine running without a dual injection strategy. In addition, by providing the dual injection/EGR strategy described herein, the engine may perform in a sufficient manner in such that the size or capacity of the engine may be cut by 25% to 75%, including all values and increments therein, and capable of maintaining the same performance of a like engine running without a dual injection strategy.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of reducing emissions and improving knock-tolerance in an engine, comprising:
   providing air, including exhaust gas present at levels greater than 20% by total air mass;
   introducing said air, including said exhaust gas, into a combustion chamber having a volume including a piston and a cylinder head;
   injecting a first amount of fuel in a range of 60% to 95% by weight of a total fuel mass directly into said combustion chamber, when said piston is moving away from said cylinder head;
   injecting a second amount of fuel in the range of 5% to 40% by weight of the total fuel mass directly into said combustion chamber, when said piston is moving towards said cylinder head; and
   igniting said first and second amounts of fuel, wherein the ratio of said air, including said exhaust gas, to said first and second amounts of fuel is maintained in a range from 14.0:1 to 15.0:1.

2. The method of claim 1, wherein a stratified fuel charge is formed within said cylinder by said first and second amounts of fuel.

3. The method of claim 1, wherein said combustion chamber includes a spark plug and said air to fuel ratio is greater than stoichiometric in a portion of said combustion chamber surrounding said spark plug.

4. The method of claim 1, wherein said exhaust gas includes greater than 50% by total exhaust gas mass high pressure exhaust gas when engine is operating at low loads and/or cold temperatures.

5. The method of claim 1, wherein said exhaust gas includes greater than 50% by total exhaust gas mass low pressure exhaust gas when engine is operating at high loads and/or high temperatures.

6. The method of claim 1, wherein said air to fuel ratio is 14.6:1.

7. A system for reducing emissions and controlling knock, comprising:
   a combustion chamber having a volume including a piston and a cylinder head,
   a fuel injector, configured to directly inject fuel into said combustion chamber;
   an electronic control system in electrical communication with said fuel injector;
   a high pressure exhaust gas recirculation valve in electrical communication with said electronic control system;
   a low pressure exhaust gas recirculation valve in electrical communication with said electronic control system;
   wherein said electronic control system is configured to:
      introduce air, including exhaust gas present at levels greater than 20% by total air mass, into said combustion chamber;
      inject a first amount of fuel in a range of 60% to 95% by weight of a total fuel mass directly into said combustion chamber, when said piston is moving away from said cylinder head;
      inject a second amount of fuel in the range of 5% to 40% by weight of the total fuel mass directly into said combustion chamber, when said piston is moving towards said cylinder head; and
      ignite said first and second amounts of fuel, wherein the ratio of said air, including said exhaust gas, to said first and second amounts of fuel is maintained in a range from 14.0:1 to 15.0:1.

8. The system of claim 7, wherein said combustion chamber includes a spark plug and said engine control unit is configured to ignite said fuel by said spark plug.

9. The system of claim 7, wherein said engine control unit is configured to regulate said high pressure exhaust gas recirculation valve when said engine is operating at low loads and/or cold temperatures such that said high pressure exhaust gas is greater than 50% by total exhaust gas mass.

10. The system of claim 7, wherein said engine control unit is configured to regulate said low pressure exhaust gas recirculation valve when said engine is operating at high loads and/or high temperatures such that said low pressure exhaust gas is greater than 50% by total exhaust gas mass.

11. The system of claim 7 wherein said stoichiometric air to fuel ratio is 14.6:1.

12. The system of claim 7, wherein a knock sensor is in electrical communication with said control unit.

* * * * *